(12) United States Patent
Heater et al.

(10) Patent No.: US 7,814,764 B1
(45) Date of Patent: Oct. 19, 2010

(54) PORTABLE POWERED AIR CONDITIONER

(76) Inventors: Tim Heater, 2771 Big Run Rd., Walkersville, WV (US) 26447; Tim Weber, 2771 Big Run Rd., Walkersville, WV (US) 26447; Scott Hall, 2771 Big Run Rd., Walkersville, WV (US) 26447; Chuck Reed, 2771 Big Run Rd., Walkersville, WV (US) 26447; David Ables, 2771 Big Run Rd., Walkersville, WV (US) 26447; Mike Carpenter, 2771 Big Run Rd., Walkersville, WV (US) 26447

( * ) Notice: Subject to any disclaimer, the term of this patent is extended or adjusted under 35 U.S.C. 154(b) by 88 days.

(21) Appl. No.: 11/877,752

(22) Filed: Oct. 24, 2007

(51) Int. Cl.
F25B 15/00 (2006.01)
(52) U.S. Cl. ............................................. 62/476
(58) Field of Classification Search .................. 62/476, 62/271, 3.4, 3.3, 480
See application file for complete search history.

(56) References Cited

U.S. PATENT DOCUMENTS

| | | | |
|---|---|---|---|
| 3,740,964 A | 6/1973 | Herweg | |
| 3,777,506 A | 12/1973 | Hergatt et al. | |
| 3,850,006 A | 11/1974 | Redfern et al. | |
| 3,961,496 A * | 6/1976 | Ku | 62/459 |
| 4,637,222 A * | 1/1987 | Fujiwara et al. | 62/244 |
| 5,046,329 A | 9/1991 | Travis, III | |
| D342,780 S | 12/1993 | Pendergrast et al. | |
| 6,170,282 B1 | 1/2001 | Eddins | |
| 6,568,202 B1 | 5/2003 | Hodges | |

OTHER PUBLICATIONS

Web Stores America, Your Guide To Buying Portable Air Conditioners, Sunpentown WA-1310E Portable Air Conditioner, Oct. 24, 2006, http://www.air-conditioners-america.com.

* cited by examiner

*Primary Examiner*—Melvin Jones

(57) ABSTRACT

The present invention relates to an outdoor portable cooling system for patios, campsites, and other related areas. The invention is primarily to be used as a portable cooling system, but may be adapted as a permanently affixed cooling system. The invention includes a housing that contains an absorption system that would be powered by a propane burner. Heat generated by the burning propane gas can be used to operate the fan motor via a module that produces electricity from heat or whereby the motor is powered by a battery supply. The battery supply may be recharged by a solar panel or by a standard electrical line.

5 Claims, 6 Drawing Sheets

PORTABLE POWERED AIR CONDITIONER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to an outdoor portable cooling system for patios, campsites, and other related areas. Typically, portable cooling systems were limited to operating only in areas with an external source of electricity. This invention seeks to remedy this restraint by providing a method for cooling a localized outdoor area or enclosed area through the use of a propane or other flammable gas.

B. Discussion of the Prior Art

The Herweg Patent (U.S. Pat. No. 3,740,964) discloses a portable air conditioner comprising a cooling unit to be placed in a zone to be cooled, and a refrigerant condensing unit to be placed outside of the zone. However, this system is dependent on electrical power supply, as opposed to a portable air conditioner system that is powered by propane used in conjunction with a heat operated absorption refrigeration principal.

The Hergatt et al. Patent (U.S. Pat. No. 3,777,506) discloses a portable air conditioning system primarily designed for use with recreational vehicles that includes an air conditioner unit having wheels for portability and a head adapter assembly which is vertically adjustable with respect to the unit for alignment with a window in the vehicle. However, the portable air conditioning system of the Hergatt Patent utilizes a traditional air conditioner as opposed to a portable air conditioning system that is powered by propane used in conjunction with a heat operated absorption refrigeration cycle and heat operated fan motor.

The Redfern Patent et al. (U.S. Pat. No. 3,850,006) discloses a portable cooler having a built-in cooling unit and quick connector assemblies adapted to be connected into an automotive air conditioning system whereby the portable cooler may be conveniently located in the trunk area of an automobile but readily movable therefrom for use when picnicking, boating, camping, or the like. However, the portable cooler of the Redfern Patent is powered by the air conditioning system of a vehicle, which is not a self-sufficient system.

The Eddins Patent (U.S. Pat. No. 6,170,282) discloses an portable air conditioner for personal use. However, the Eddins Patent does not discuss how to make or operate the portable air conditioner, or more specifically, a portable air conditioner that utilizes an absorption refrigeration principal.

The Travis III Patent (U.S. Pat. No. 5,046,329) is directed to a portable air conditioning system that utilizes a freezable gel for cooling the air flowing through the unit. However, the portable air conditioner of the Travis Patent does not utilize an absorption refrigeration system that is powered by heat produced from a propane gas source.

The Pendergrast Patent et al. (U.S. Pat. No. Des. 342,780) illustrates a design for a portable air conditioner design.

The Hodges Patent (U.S. Pat. No. 6,568,202) discloses a portable air conditioner which has a container for holding an air cooling medium, a lid for the container and a plurality of outlets in the lid which permit flexible conduits to connected to the output of the lid. However, the portable air conditioner of the Hodges Patent requires a portable electrical source in order to operate, as opposed to a portable refrigeration system utilizing an absorption refrigeration system that requires little or no electricity.

The Sunpentown Portable Air Conditioner by Web Stores America, a non-patent document available at http://www.air-conditioners-america.com, discloses a portable air conditioner that requires an external electrical supply source in order to operate.

In light of the above discussed prior art there is a need for a portable air conditioning system that uses an absorption refrigeration cycle driven by a propane gas heat source, and of which the system requires little or no electricity.

BRIEF SUMMARY OF THE INVENTION

The present invention relates to an outdoor cooling system for patios, campsites, and other related areas. The invention is primarily to be used as a portable cooling system, but may be adapted as a permanently affixed cooling system. The invention includes a housing that contains an absorption system that would be powered by a propane burner. Heat generated by the burning propane gas can be used to operate the fan motor via a module that produces electricity from heat or whereby the motor is powered by a battery supply. The battery supply may be recharged by a solar panel or by a standard electrical line.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
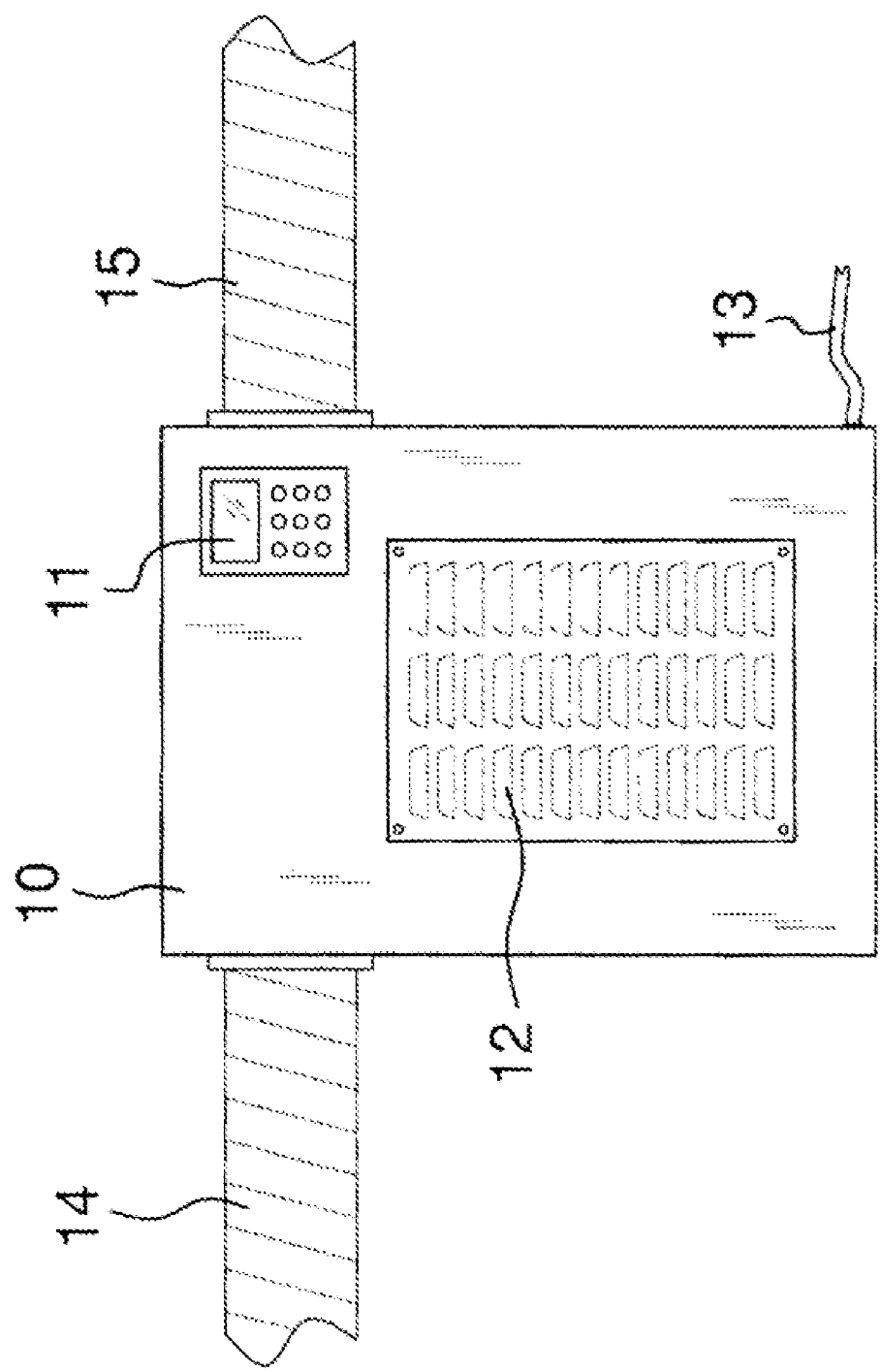
FIG. 1 illustrates a front view of the housing of the invention.
Figure 2:
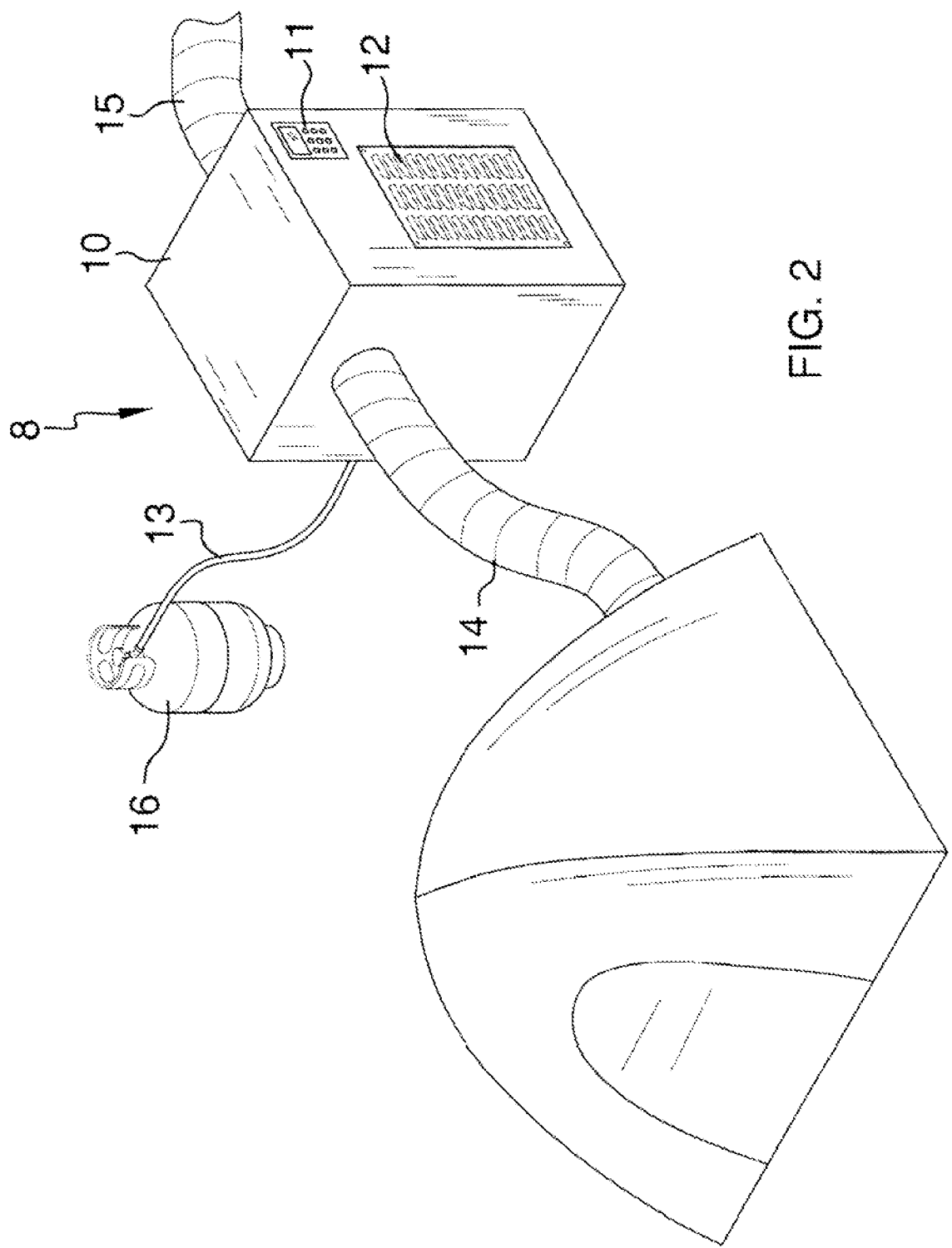
FIG. 2 illustrates an isometric view of the various components of the system.

Detailed reference will now be made to the present invention, examples of which are illustrated in FIGS. 1-3. A portable air conditioning system 8 (hereinafter invention)

includes a housing 10, including a control panel 11, a grill plate 12, a propane line 13, an outlet duct 14, and an inlet duct 15, and a propane tank 16.

As a preliminary matter the term refrigerant is the term of use, unless otherwise specified, and of which consists of part ammonia, water, and hydrogen.

Figure 3A:
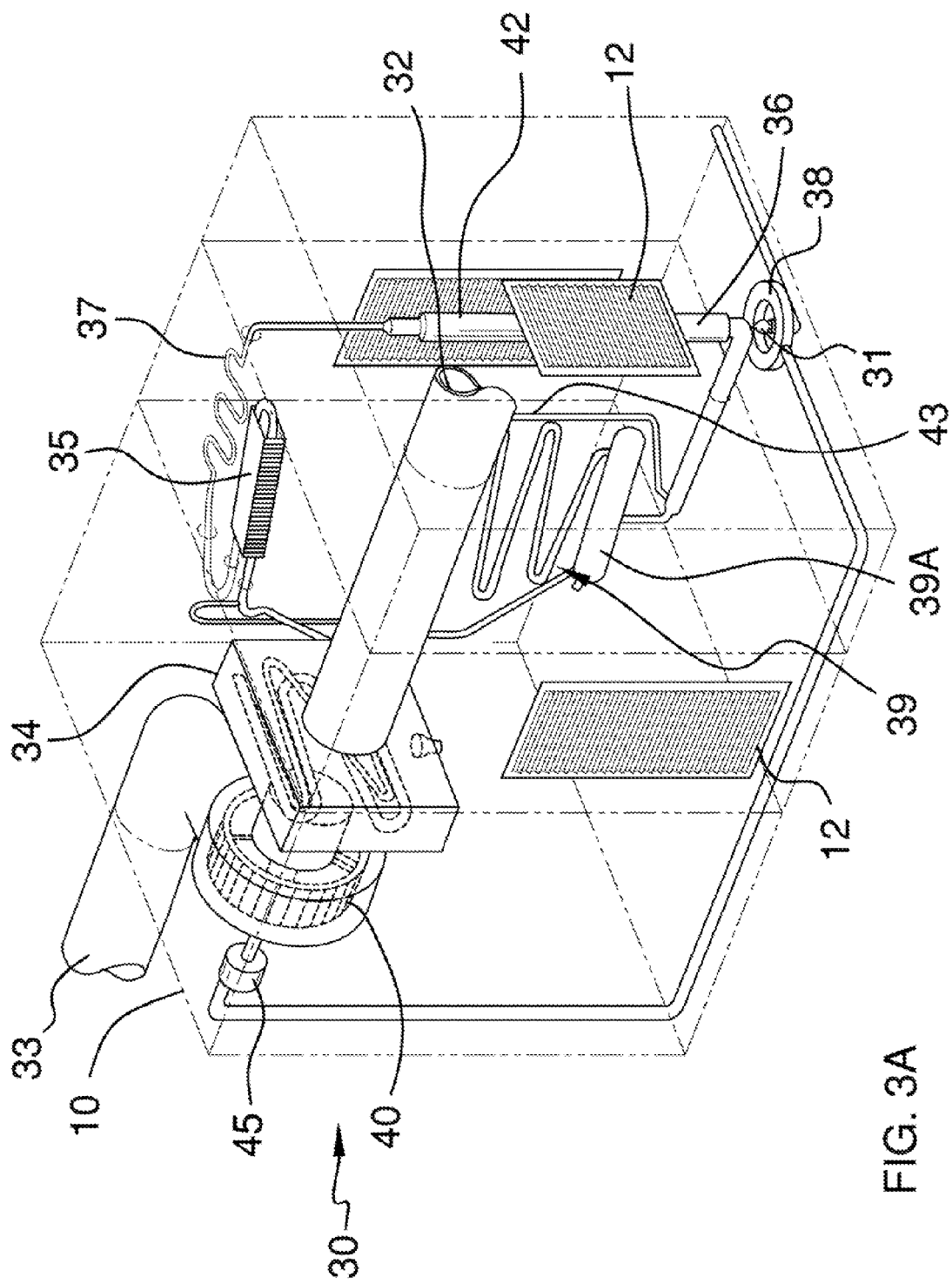
FIG. 3A illustrates a mechanical diagram of the absorption system with a thermoelectric power module.

Referring to FIG. 3A, a first embodiment of the invention 8 has located within the housing 10 is an absorption system 30. The absorption system 30 includes a burner 31, a return port 32, a supply port 33, an evaporator 34, a condenser 35, a central tube 36, a water separator 37, a thermoelectric power module 38, an absorber 39, an absorber vessel 39A, a fan 40, and a low voltage, high efficiency DC fan motor 45 (hereinafter fan motor).

It shall be noted that the central tube 36 consists of a boiler and a siphon pump (not depicted in detail). The heat generated by the burner 31, is introduced into the region designated as central tube 36, and that the actual piping contains along the bottom portion a boiler (not shown), and along the top portion a siphon pump (not shown). It is known to those skilled in the art how a boiler and siphon pump operates, and as such no discussion is warranted.

It shall be noted that the absorption system 30 may include a plurality of burners 31. However, in FIG. 3A, the power module 38 is provided heat by the burner 31, and is positioned above and/or around by the flame of the burner 31.

The thermoelectric power module 38 drives the fan motor 45 by transforming heat into electricity, which is not depicted. The fan motor 45 may be powered by a battery supply (not shown), whereby the battery supply shall be rechargeable by an electrical line (not shown) or by a solar array (not shown) that is mounted on the housing 10.

It shall be noted that the thermoelectric power module 38 may be wired in series or parallel to provide necessary voltage and amperage to the fan motor 45.

The burner 31 shall be connected to the propane line 13, and provide heat immediately underneath the region of piping designated as the central tube 36. The location of the burner 31 with respect to the thermoelectric power module 38 is designed to provide heat energy to the thermoelectric power module 38 and to thereby transform heat energy into electricity.

It shall be further noted that the location of the burner 31 is to heat the piping underneath the region designated the central tube 36, which raises the temperature of the refrigerant thereby creating bubbles of ammonia gas. The bubbles of ammonia gas rise up the piping from the central tube, and carry a weak ammonia solution upwards towards the water separator 37.

It shall be further noted that the weak ammonia solution contains a small amount of water, and that both the water and the weak ammonia solution pass up the piping to point 43 as well as to the water separator 37.

The water separator 37 condenses any water vapor, and returns it back into the boiler (not shown), which yields a dry ammonia vapor to pass onto the condenser 35.

The condenser 35 removes heat from the refrigerant by the outside air passing over the fins of the condenser 35 causing the refrigerant to condense to a liquid state.

It shall be noted that the hydrogen located in the absorption system 30 travels up to the evaporator 34 where the hydrogen passes over the liquefied ammonia, which causes the vapor pressure of the ammonia to drop sufficiently thereby causing evaporation. The evaporation of the ammonia extracts heat from the air that is pulled over the coils containing the ammonia-hydrogen solution of the evaporator 34.

The mixture of ammonia and hydrogen passes from the evaporator 34 over to the absorber 39. Entering the upper portion of the absorber 39 from the piping location designated as 43 is the weak ammonia solution. The mixture of the hydrogen and ammonia from the evaporator 34 with the weak ammonia solution from the boiler (not shown) causes the weak ammonia solution to be absorbed, thereby freeing the hydrogen. The hydrogen then passes back through the absorber 39 and into the evaporator 34.

It shall be noted that the hydrogen passes back and forth between the evaporator 34 and the upper piping of the absorber 39.

The ammonia produced in the absorber 39 flows back into the absorber vessel 39A, and back over to the central tube 36 where the boiler (not shown) and the siphon pump (not shown) are located.

The location of the absorber 39 and the absorber vessel 39A are adjacent to the grill plate 12, as depicted in FIG. 3. The grill plate 12 provides a means of egress for heat generated inside of the housing 10.

The location of the evaporator 34 with respect to the housing 10 shall be immediately adjacent to the grill plate 12 so as to enable ease in cleaning the evaporator 34.

A propane tank 16 provides a continuous supply of propane via the propane line 13 into the housing 10 and is combusted at the location of the burner 31.

An inlet duct 15 connects to the return port 32 and directs air that passes through the evaporator 34. The fan 40 directs the cooled air out through the supply port 33, which is connected to the outlet duct 14.

Figure 3B:
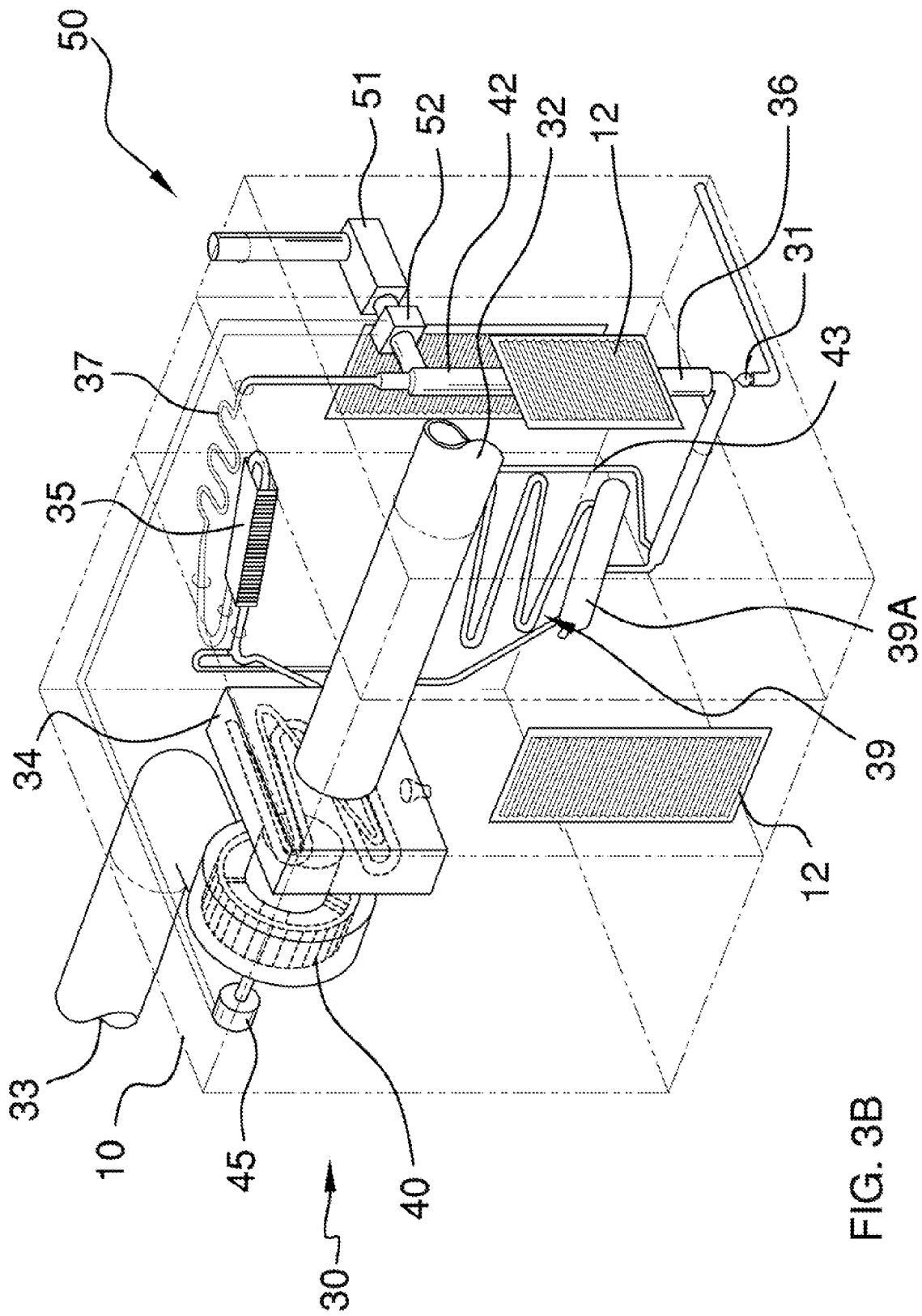
FIG. 3B illustrates a mechanical diagram of the absorption system with a thermoelectric power generator module.
Figure 4:
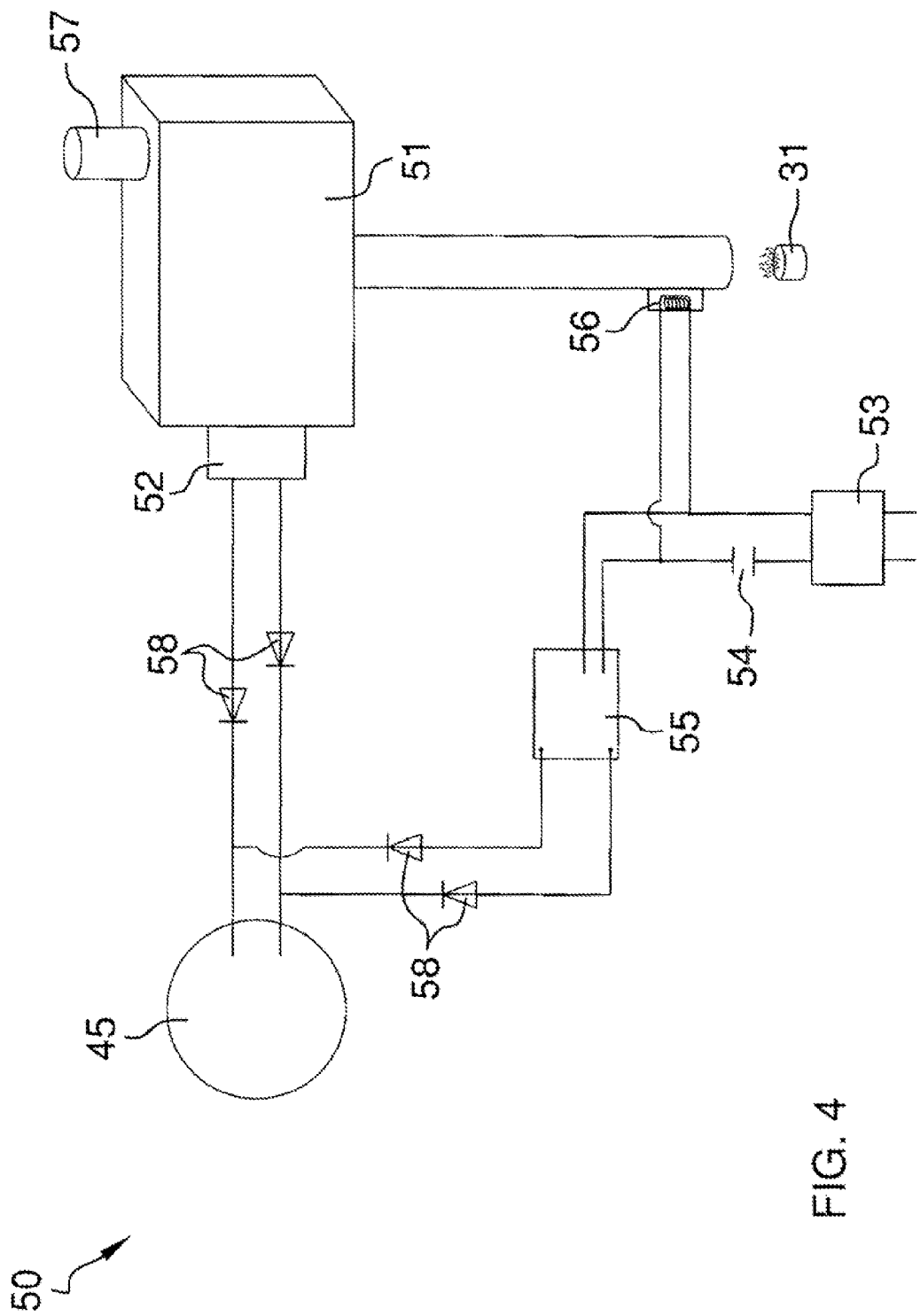
FIG. 4 illustrates an electrical diagram of a thermoelectric power generator module that may be substituted for a rechargeable battery supply or as an alternate location for generating electricity.

Referring to FIG. 3B, a second embodiment of the invention 8 contains a thermoelectric power generator 50. FIG. 4 provides for the electrical diagram should the thermoelectric power generator 50 be employed over the thermoelectric power module 38, or the battery supply (not shown) that is charged by either a solar array (not shown) or with an electrical line (not shown). It shall be noted that the thermoelectric power generator 50 includes both a heat exchanger 51 and a thermoelectric power generator module 52.

Referring to FIG. 4, the thermoelectric power generator module 52 could be mounted on the heat exchanger 51 that would be positioned near the burner 31.

Heat introduced by a burner flame 31 into the heat exchanger 51 is converted into electricity by the thermoelectric power generator module 52. The invention 8 may include an AC line voltage 53, if necessary a thermostat 54, an inverter 55, an electronic heater coil 56, and diodes 58. The diodes 58 control the pathway of electricity. The electronic heater coil 56 would be used to power the thermoelectric power generator module 52 and the absorption system 30 when no propane is available. It shall be noted that the heat exchanger 51 contains an exhaust 57.

Figure 5:
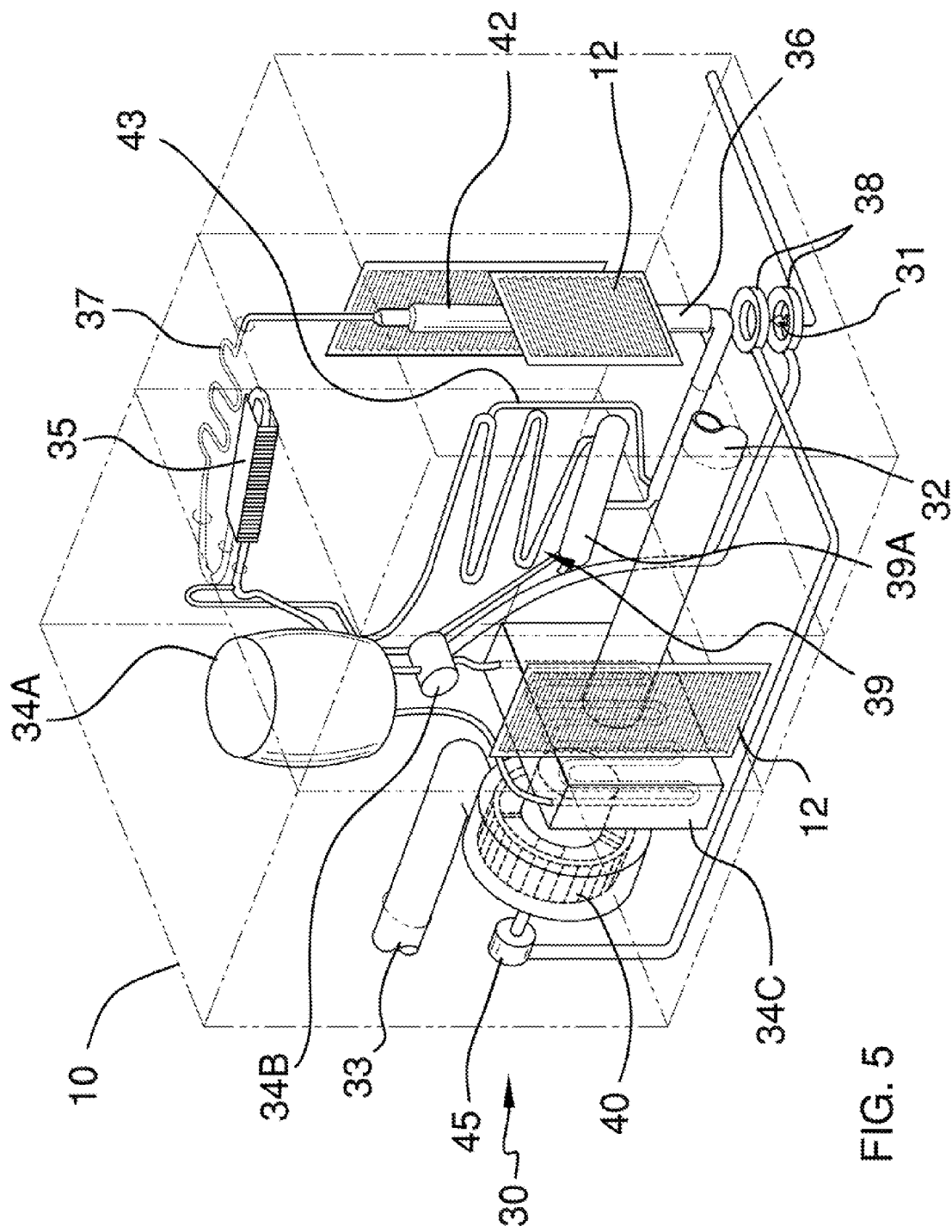
FIG. 5 illustrates a mechanical diagram of the absorption system with a water chiller.

Referring to FIG. 5, a third embodiment of the invention 8 is depicted using a thermoelectric power module 38 in a similar fashion as depicted in FIG. 3A. The third embodiment of the invention 8 includes a Bromine water cycle, which includes a barrel chiller 34A, a pump 34B, and a chilled water coil 34C. The main difference between the third embodiment of the invention 8 as depicted in FIG. 5 and the second embodiment of the invention 8 as depicted in FIG. 3A is the exclusion of the evaporator 34. Instead the refrigerant from the condenser 35 passes directly into the barrel chiller 34A, and a second thermoelectric power module 38 is located above the burner 31 in order to generate electricity for powering the pump 34B.

A variation of the third embodiment of the invention 8 would provide for the inclusion of a thermoelectric power generator module 52 and heat exchanger 51 as depicted in FIG. 3B.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A portably powered air conditioning system comprising:
   (a) a housing;
   (b) a control panel;
   (c) a grill plate;
   (d) an inlet and outlet duct;
   (e) an absorption system comprising a propane burner, a central tube containing a boiler and siphon pump, a water separator, a condenser, an evaporator, an absorber, and an absorber vessel;
   (f) a thermoelectric power generator consists of a collection box/heat exchanger, exhaust port, a thermoelectric power generator module, a high efficiency DC fan motor (hereinafter fan motor), an inverter, a thermostat, an AC line voltage, a plurality of diodes, and an electronic heater coil;
      wherein the thermoelectric power generator module takes heat energy that has been collected by the collection box/heat exchanger and transforms the heat energy into electricity;
      wherein the thermoelectric power generator module is wired to the fan motor;
      wherein the collection box/heat exchanger has piping directed into the collection box/heat exchanger from a region of piping above and adjacent to the siphon pump of the central tube;
      wherein the exhaust port is connected to the collection box/heat exchanger and releases any remaining heat energy that has passed through the collection box/heat exchanger out of the housing;
      wherein the electronic heater coil is located near the heat energy introduced into the collection box/heat exchanger;
      wherein the electronic heater coil produces heat by the introduction of electricity via the AC line voltage in the event no propane or natural gas is available to operate the burner;
      wherein the thermostat would be used to regulate the portably powered air conditioner when no propane gas or natural gas is available;
      wherein the thermostat would be electrically wired between the AC line voltage and the inverter;
      wherein the inverter is wired between the thermostat and the fan motor; and
      wherein at least one pair of diodes would be located between the inverter and the fan motor;
      wherein at least two diodes are located on the wiring between the thermoelectric power generator module and the fan motor;
   wherein located within the housing is the burner, a return port, a supply port, the central tube containing the boiler and the siphon pump, the water separator, the evaporator, the condenser, the absorber, the absorber vessel, the thermoelectric power generator module, the fan motor, and a fan;
   wherein the central tube contains the boiler along the bottom portion of the central tube;
   wherein the central tube contains the siphon pump along the top portion of the central tube;
   wherein the flame from the burner directs heat onto a region of piping of the absorption cycle that is underneath the central tube containing the boiler;
   wherein the absorption system contains a refrigerant consisting of ammonia, water, and hydrogen;
   wherein the central tube is located between the burner and the water separator;
   wherein the condenser is located between the water separator and the evaporator;
   wherein the absorber is located between the evaporator and the absorber vessel;
   wherein the burner is located between the absorber vessel and the central tube;
   wherein the refrigerant passes throughout the absorption system upon the introduction of heat from the burner, which in turn causes the refrigerant to pass over the evaporator cooling outside air that is moved by the fan;
   wherein water and a weak ammonia solution pass through both the boiler and the siphon pump to the water separator;
   wherein the water condenses at the water separator and returns to the boiler;
   wherein the weak ammonia solution at the water separator passes to the condenser and liquefies;
   wherein the liquefied ammonia passes over to the evaporator;
   wherein hydrogen is introduced into the evaporator and mixes with the liquefied ammonia thereby causing the ammonia to evaporate and cool the outside air that passes over the coils of the evaporator;
   wherein the ammonia and hydrogen travel down the piping away from the evaporator and into the absorber;
   wherein the cooled air is circulated by the fan motor and out through the supply port and into the outlet duct whereby the cooled air cools the area so connected to the portable air conditioner;
   wherein the return port is connected to the fan and the inlet duct; and
   wherein the cooled air that exits the supply duct and cools the area to be cooled, is subsequently cycled back through the distributor via the inlet duct and the return port.

2. The portably powered air conditioner as described in claim 1 wherein the collection box/heat exchanger has a separate burner that has a sole purpose of providing heat energy to the collection box/heat exchanger.

3. A portably powered air conditioner comprising:
   (a) a water coil;
      wherein the water coil has an output and an input;
   (b) a pump;
      wherein the pump has an output and an input;
   (a) a chiller barrel;
      wherein the chiller barrel has an output and an input;
   wherein the output of the chiller barrel is piped to the input of the pump;
   wherein the output of the pump is piped to the input of the water coil;
   wherein the output of the water coil is piped to the side of the chiller barrel;
   wherein a bromine water cycle circulates a bromine water solution; and
   (b) an inlet and outlet duck;

(c) an absorption system comprising a propane burner, a central tube containing a boiler and siphon pump, a water separator, a condenser, the bromine water cycle, an absorber, and an absorber vessel;

(d) a thermoelectric power generator consists of a collection box/heat exchanger, exhaust port, a thermoelectric power generator module, a DC fan motor (hereinafter fan motor), an inverter, a thermostat, an AC line voltage, a plurality of diodes, and an electronic heater coil;

wherein the thermoelectric power generator module takes heat energy that has been collected by the collection box/heat exchanger and transforms the heat energy into electricity;

wherein the thermoelectric power generator module is wired to the fan motor;

wherein the collection box/heat exchanger has piping directed into the collection box/heat exchanger from a region of piping above and adjacent to the siphon pump of the central tube;

wherein the exhaust port is connected to the collection box/heat exchanger and releases any remaining heat energy that has passed through the collection box/heat exchanger out of the housing;

wherein the electronic heater coil is located near the heat energy introduced into the collection box/heat exchanger;

wherein the electronic heater coil produces heat by the introduction of electricity via the AC line voltage in the event no propane or natural gas is available to operate the burner;

wherein the thermostat is used to regulate the portably powered air conditioner when no propane gas or natural gas is available;

wherein the thermostat is electrically wired between the AC line voltage and the inverter;

wherein the inverter is wired between the thermostat and the fan motor; and wherein at least one pair of diodes is located between the inverter and the fan motor;

wherein at least two diodes are located on the wiring between the thermoelectric power generator module and the fan motor;

wherein located within the housing is the burner, a return port, a supply port, the central tube containing the boiler and the siphon pump, the water separator, the bromine water cycle, the condenser, the absorber, the absorber vessel, the thermoelectric power generator module, the fan motor, and a fan;

wherein the central tube contains the boiler along the bottom portion of the central tube;

wherein the central tube contains the siphon pump along the top portion of the central tube;

wherein the flame from the burner directs heat onto a region of piping of the absorption cycle that is underneath the central tube containing the boiler;

wherein the central tube is located between the burner and the water separator;

wherein the condenser is located between the water separator and the bromine water cycle;

wherein the absorber is located between the bromine water cycle and the absorber vessel;

wherein the burner is located between the absorber vessel and the central tube; and wherein the thermoelectric power generator module is, in addition to the DC fan motor, wired to provide electricity to the pump.

4. A portably powered air conditioner comprising;

(a) a water coil;

wherein the water coil has an output and an input;

(b) a pump;

wherein the pump has an output and an input;

(c) a chiller barrel;

wherein the chiller barrel has an output and an input;

wherein the output of the chiller barrel is piped to the input of the pump;

wherein the output of the pump is piped to the input of the water coil;

wherein the output of the water coil is piped to the side of the chiller barrel;

wherein a bromine water cycle circulates a bromine water solution; and (a) an inlet and outlet duct;

(b) an absorption system comprising a propane burner, a central tube containing a boiler and siphon pump, a water separator, a condenser, the bromine water cycle, an absorber, and an absorber vessel;

(c) a thermoelectric power generator consists of a collection box/heat exchanger, exhaust port, a thermoelectric power module, a DC fan motor (hereinafter fan motor), an inverter, a thermostat, an AC line voltage, a plurality of diodes, and an electronic heater coil;

wherein the thermoelectric power module takes heat energy that has been collected by the collection box/heat exchanger and transforms the heat energy into electricity;

wherein the thermoelectric power module is wired to the fan motor;

wherein the collection box/heat exchanger has piping directed into the collection box/heat exchanger from a region of piping above and adjacent to the siphon pump of the central tube;

wherein the thermoelectric power module is located adjacent to the burner and the region of piping located near the central tube;

wherein the exhaust port is connected to the collection box/heat exchanger and releases any remaining heat energy that has passed through the collection box/heat exchanger out of the housing;

wherein the electronic heater coil is located near the heat energy introduced into the collection box/heat exchanger;

wherein the electronic heater coil produces heat by the introduction of electricity via the AC line voltage in the event no propane or natural gas is available to operate the burner;

wherein the thermostat is used to regulate the portably powered air conditioner when no propane gas or natural gas is available;

wherein the thermostat is electrically wired between the AC line voltage and the inverter;

wherein the inverter is wired between the thermostat and the fan motor; and wherein at least one pair of diodes is located between the inverter and the fan motor;

wherein at least two diodes are located on the wiring between the thermoelectric power generator module and the fan motor;

wherein located within the housing is the burner, a return port, a supply port, the central tube containing the boiler and the siphon pump, the water separator, the bromine water cycle, the condenser, the absorber, the absorber vessel, the thermoelectric power module, the fan motor, and a fan;

wherein the central tube contains the boiler along the bottom portion of the central tube;

wherein the central tube contains the siphon pump along the top portion of the central tube;

wherein the flame from the burner directs heat onto a region of piping of the absorption cycle that is underneath the central tube containing the boiler;

wherein the central tube is located between the burner and the water separator;

wherein the condenser is located between the water separator and the bromine water cycle;

wherein the absorber is located between the bromine water cycle and the absorber vessel;

wherein the burner is located between the absorber vessel and the central tube;

wherein the thermoelectric power module is, in addition to the DC an motor, wired to provide electricity to the pump.

5. A portably powered air conditioning system comprising:
(a) a housing;
(b) a control panel;
(c) a grill plate;
(d) an inlet and outlet duct;
(e) an absorption system comprising a propane burner, a central tube containing a boiler and siphon pump, a water separator, a condenser, an evaporator, an absorber, and an absorber vessel;
(f) a thermoelectric power generator consists of a collection box/heat exchanger, exhaust port, a thermoelectric power module, a high efficiency DC fan motor (hereinafter fan motor), an inverter, a thermostat, an AC line voltage, a plurality of diodes, and an electronic heater coil;
   wherein the thermoelectric power module takes heat energy that has been collected by the collection box/heat exchanger and transforms the heat energy into electricity;

wherein the thermoelectric power module is wired to the fan motor;

wherein the collection box/heat exchanger has piping directed into the collection box/heat exchanger from a region of piping above and adjacent to the siphon pump of the central tube;

wherein the exhaust port is connected to the collection box/heat exchanger and releases any remaining heat energy that has passed through the collection box/heat exchanger out of the housing;

wherein the electronic heater coil is located near the heat energy introduced into the collection box/heat exchanger;

wherein the electronic heater coil produces heat by the introduction of electricity via the AC line voltage in the event no propane or natural gas is available to operate the burner;

wherein the thermostat would be used to regulate the portably powered air conditioner when no propane gas or natural gas is available;
   wherein the thermostat would be electrically wired between the AC line voltage and the inverter;
   wherein the inverter is wired between the thermostat and the fan motor; and
   wherein at least one pair of diodes would be located between the inverter and the fan motor;
   wherein at least two diodes are located on the wiring between the thermoelectric power module and the fan motor;

wherein located within the housing is the burner, a return port, a supply port, the central tube containing the boiler and the siphon pump, the water separator, the evaporator, the condenser, the absorber, the absorber vessel, the thermoelectric power generator module, the fan motor, and a fan;

wherein the central tube contains the boiler along the bottom portion of the central tube;

wherein the central tube contains the siphon pump along the top portion of the central tube;

wherein the flame from the burner directs heat onto a region of piping of the absorption cycle that is underneath the central tube containing the boiler;

wherein the absorption system contains a refrigerant consisting of ammonia, water, and hydrogen;

wherein the central tube is located between the burner and the water separator;

wherein the condenser is located between the water separator and the evaporator;

wherein the absorber is located between the evaporator and the absorber vessel;

wherein the burner is located between the absorber vessel and the central tube;

wherein the refrigerant passes throughout the absorption system upon the introduction of heat from the burner, which in turn causes the refrigerant to pass over the evaporator cooling outside air that is moved by the fan;

wherein water and a weak ammonia solution pass through both the boiler and the siphon pump to the water separator;

wherein the water condenses at the water separator and returns to the boiler;

wherein the weak ammonia solution at the water separator passes to the condenser and liquefies;

wherein the liquefied ammonia passes over to the evaporator;

wherein hydrogen is introduced into the evaporator and mixes with the liquefied ammonia thereby causing the ammonia to evaporate and cool the outside air that passes over the coils of the evaporator;

wherein the ammonia and hydrogen travel down the piping away from the evaporator and into the absorber;

wherein the cooled air is circulated by the fan motor and out through the supply port and into the outlet duct whereby the cooled air cools the area so connected to the portable air conditioner;

wherein the return port is connected to the fan and the inlet duct; and wherein the cooled air that exits the supply duct and cools the area to be cooled, is subsequently cycled back through the distributor via the inlet duct and the return port.

* * * * *